(12) United States Patent
Chen et al.

(10) Patent No.: US 7,350,066 B2
(45) Date of Patent: Mar. 25, 2008

(54) COMPUTER PERIPHERAL OPERATING EVENT RESPONDING METHOD AND SYSTEM

(75) Inventors: Aaron Chen, Taipei (TW); Jia-Shiung Kuo, Taipei (TW)

(73) Assignee: Inventec Corporation (TW)

( * ) Notice: Subject to any disclaimer, the term of this patent is extended or adjusted under 35 U.S.C. 154(b) by 417 days.

(21) Appl. No.: 11/043,645

(22) Filed: Jan. 25, 2005

(65) Prior Publication Data

US 2006/0168593 A1   Jul. 27, 2006

(51) Int. Cl.
*G06F 9/00* (2006.01)
(52) U.S. Cl. .................... 713/1; 341/22; 719/318; 345/172
(58) Field of Classification Search ............ 341/22; 719/318; 345/172
See application file for complete search history.

(56) References Cited

U.S. PATENT DOCUMENTS

| | | | | |
|---|---|---|---|---|
| 5,210,749 A | * | 5/1993 | Firoozmand | 370/463 |
| 6,389,490 B1 | * | 5/2002 | Camilleri et al. | 710/57 |
| 7,032,226 B1 | * | 4/2006 | Nemirovsky et al. | 719/318 |
| 7,076,646 B2 | * | 7/2006 | Chang | 713/1 |
| 2003/0233485 A1 | * | 12/2003 | Khan | 709/318 |
| 2006/0002374 A1 | * | 1/2006 | Trost et al. | 370/352 |

\* cited by examiner

*Primary Examiner*—Thomas Lee
*Assistant Examiner*—Jaweed A Abbaszadeh
(74) *Attorney, Agent, or Firm*—Peter F. Corless; Steven M. Jensen; Edwards Angell Palmer & Dodge LLP

(57) ABSTRACT

A computer peripheral operating event responding method and system is proposed, which is designed for use in conjunction with a computer platform for providing a peripheral operating events responding function, and which is more advantageous to use than prior art particularly in that it can be implemented without utilizing keyboard scan code and IRQ/PCI interrupt signals to provide the peripheral operating events responding function and is capable of responding to both on-keyboard peripheral operating events (such as hot-key pressing events) and off-keyboard peripheral operating events (such as docking station engaging/disengaging event and multi-bay CD-ROM hot-plug event), thus representing a highly integrated and efficient solution for computer peripheral operating event responding functionality.

9 Claims, 2 Drawing Sheets

| Peripheral Operating Event | Event Code |
|---|---|
| Fn + (key) Pressing Event | 0 to 128 |
| Fn Pressing Event | 200 (0xC8) |
| Fn Twice Pressing Event (Under Twice Lock Condition) | 202 (0xCA) |
| Fn Disengaging Event | 203 (0xCB) |
| First Access Key Pressing Event | 220 (0xDC) |
| Second Access Key Pressing Event | 221 (0xDD) |
| Media Player "PREV" Key Pressing Event | 222 (0xDE) |
| Media Player "NEXT" Key Pressing Event | 223 (0xDF) |
| Media Player "PLAY/PAUSE" Key Pressing Event | 224 (0xE0) |
| Media Player "STOP" Key Pressing Event | 225 (0xE1) |
| Docking Station Engaging Event | 240 (0xF0) |
| Docking Station Disengaging Event | 241 (0xF1) |
| "EJECT" Key Pressing Event | 242 (0xF2) |

FIG. 2

COMPUTER PERIPHERAL OPERATING EVENT RESPONDING METHOD AND SYSTEM

BACKGROUND OF THE INVENTION

1. Field of the Invention

This invention relates to information technology (IT), and more particularly, to a computer peripheral operating event responding method and system which is designed for use in conjunction with a computer platform, such as a desktop computer, a notebook computer, a tablet computer, and the like, for the software layer (i.e., operating system) of the computer platform to respond to a series of peripheral operating events, including, for example, hot-key pressing events, media player activating key pressing events, docking station engaging events, docking station disengaging events, multi-bay CD-ROM hot-plug events, fan driving events, to name a few, that are initiated at the hardware layer (i.e., the peripheral interface) of the computer platform, for the purpose of allowing the software layer to be able to respond to these peripheral operating events by executing corresponding event handling programs.

2. Description of Related Art

Computer platforms nowadays, such as desktop computers, notebook computers, tablet computer, and the like, are typically equipped with various fast keys (commonly called "hot keys"), such as power management keys, diagnostic utility activating keys, Internet activating keys, email program activating keys, media player activating keys, to name just a few, on their peripheral interface such as keyboard, for the user to more quickly activate the desired program by simply pressing just one key or key combination on the keyboard, rather than tediously using the mouse to flip and search through many menus or dialog boxes in the operating system for the command options or buttons that are used to activate the desired program. The use of fast keys thus can help simplify computer operations for the user.

Presently, one method for implementing fast key pressing event responding function is to utilize the keyboard scan code to monitor whether any fast key has been pressed down; and if a fast key is found to be pressed down, the standard IRQ (Interrupt ReQuest) or PCI (Peripheral Component Interconnect) interrupt handing method is utilized to activate the corresponding event handling program in the software layer (i.e., the operating system) of the computer platform to thereby provide the intended functionality to the fast key.

One drawback to the utilization of keyboard scan code and IRQ/PCI in combination to respond to fast key pressing events is that it would complicate the architecture of the interface between the keyboard and the operating system of the computer platform, thus making the interface complex and difficult to design. Besides, it would undesirably affect the normal operations of standard keys on the keyboard, thus reducing the efficiency of data input by the keyboard.

In addition, most notebook computers nowadays are equipped with peripheral expansion interface for the user to engage his/her notebook computer to various other peripheral functional modules as docking stations, multi-bay CD-ROM modules, and so on, for the purpose of expanding the capabilities of the notebook computer. When such a peripheral functional module is engaged to a notebook computer, the BIOS and operating system of the notebook computer will respond to this event by automatically performing related setups to allow the notebook computer to be capable of operating with the engaged peripheral functional modules.

Presently, one method for implementing the responding to peripheral functional module engaging events is to utilize an independent mechanism that is separated from the above-mentioned fast-key pressing event responding mechanism. For this sake, it is required to design two separate peripheral operating event responding mechanisms, which would undesirably complicate the software development process.

SUMMARY OF THE INVENTION

It is therefore an objective of this invention to provide a computer peripheral operating event responding method and system which can be implemented without utilizing keyboard scan code and IRQ/PCI interrupt signals to provide a peripheral operating event responding function.

It is another objective of this invention to provide a computer peripheral operating event responding method and system which is capable of responding to both fast-key pressing events and peripheral functional module engaging events without having to design two separate event responding mechanisms respectively for these two kinds of events, so that the software development process can be more simplified.

The computer peripheral operating event responding method and system according to the invention is designed for use in conjunction with a computer platform, such as a desktop computer, a notebook computer, a tablet computer, and the like, for the software layer (i.e., operating system) of the computer platform to respond to a series of peripheral operating events, including, for example, hot-key pressing events, media player key pressing events, docking station engaging events, docking station disengaging events, multi-bay CD-ROM hot-plug events, fan driving events, to name a few, that are initiated at the hardware layer (i.e., the peripheral interface) of the computer platform, for the purpose of allowing the software layer to be able to respond to these peripheral operating events by executing corresponding event handling programs.

The computer peripheral operating event responding method and system according to the invention is characterized by the provision of a firmware-layer queuing buffer in the firmware layer of the computer platform for temporarily storing the event code of every peripheral operating event occurs on the computer platform, which is periodically checked by the software layer to see if any event code is stored in the firmware-layer queuing buffer; and if YES, all the event codes in the firmware-layer queuing buffer are transferred to a software-layer queuing buffer in the software layer so as to allow the software layer (i.e., operating system) to process these event codes sequentially.

The computer peripheral operating event responding method and system according to the invention is more advantageous to use than prior art particularly in that it can be implemented without utilizing keyboard scan code and IRQ/PCI interrupt signals to provide a peripheral operating events responding function and is capable of responding to both on-keyboard peripheral operating events (such as hot-key pressing events) and off-keyboard peripheral operating events (such as docking station engaging event, docking station disengaging event, multi-bay CD-ROM hot-plug event, fan driving event, and so on). The invention therefore represents a highly integrated and efficient solution for computer peripheral operating event responding functionality.

BRIEF DESCRIPTION OF DRAWINGS

The invention can be more fully understood by reading the following detailed description of the preferred embodiments, with reference made to the accompanying drawings, wherein:

FIG. 2 is a schematic diagram showing an example of the data structure of an event code mapping table for various kinds of peripheral operating events on a computer platform.

DETAILED DESCRIPTION OF PREFERRED EMBODIMENTS

Figure 1:
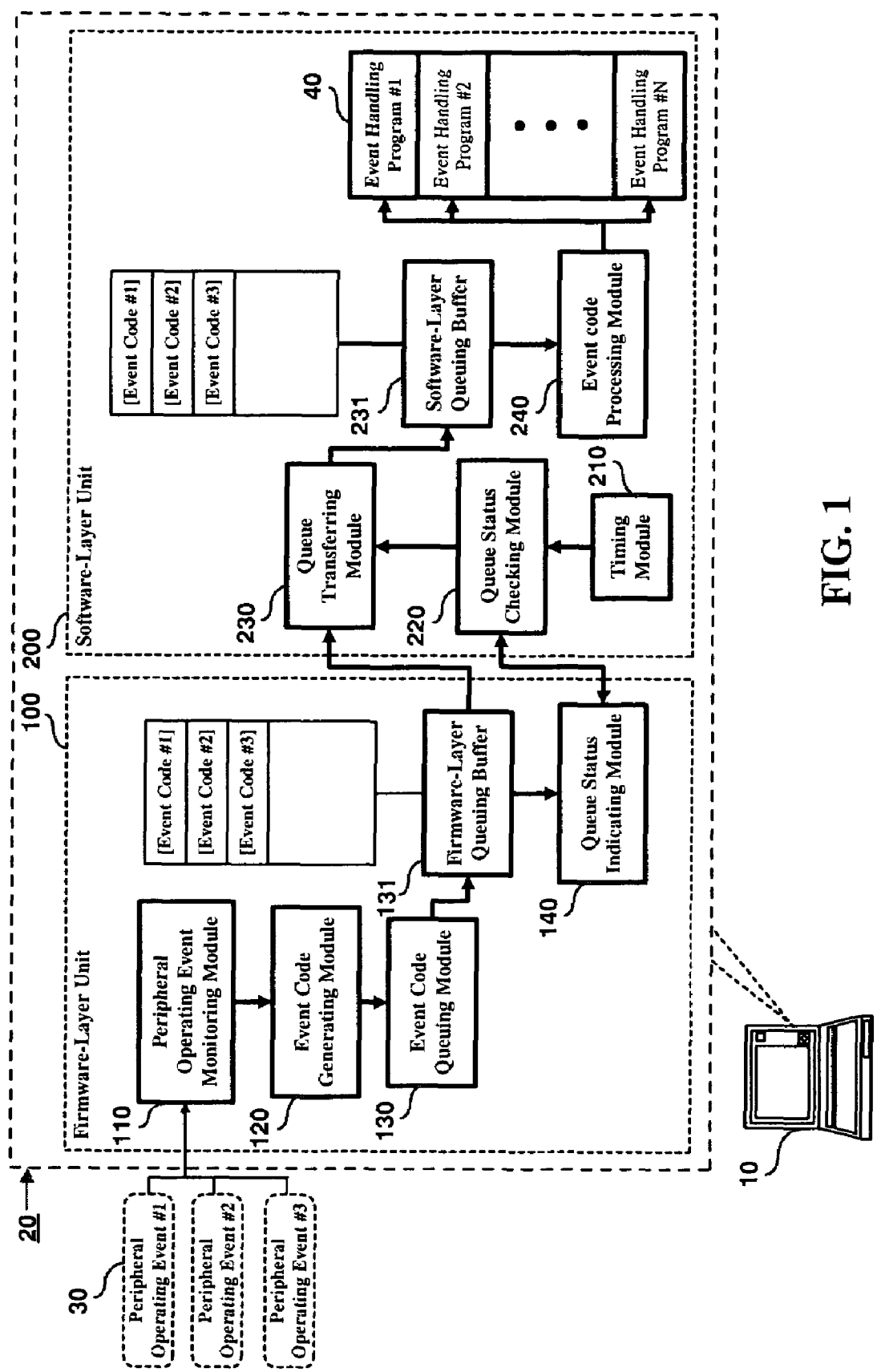
FIG. 1 is a schematic diagram showing the system architecture of the computer peripheral operating event responding system according to the invention.

The computer peripheral operating event responding method and system according to the invention is disclosed in full details by way of preferred embodiments in the following with reference to the accompanying drawings.

FIG. 1 is a schematic diagram showing the system architecture of the computer peripheral operating event responding system according to the invention (as the part enclosed in the dotted box indicated by the reference numeral 20). As shown, the computer peripheral operating event responding system of the invention 20 is designed for use in conjunction with an computer platform 10, such as a desktop computer, a notebook computer, a tablet computer, or the like, for the software layer (i.e., operating system) of the computer platform 10 to respond to a series of peripheral operating events 30, including, for example, a hot-key pressing event, a media player activating key pressing event, a docking station engaging/disengaging event, a multi-bay CD-ROM hot-plug event, a fan driving event, to name a few, that are initiated at the hardware layer (i.e., the peripheral interface) of the computer platform 10, for the purpose of allowing the software layer to be capable of responding to these peripheral operating events 30 by executing corresponding event handling programs 40.

As shown in FIG. 1, the modularized object-oriented component model of the computer peripheral operating event responding system of the invention 20 comprises: (A) a firmware-layer unit 100; and (B) a software-layer unit 200; wherein the firmware-layer unit 100 includes: (a1) a peripheral operating event monitoring module 110; (a2) an event code generating module 120; (a3) an event code queuing module 130 and an associated firmware-layer queuing buffer 131; and (a4) a queue status indicating module 140; while the software-layer unit 200 includes: (b1) a timing module 210; (b2) a queue status checking module 220; (b3) a queue transferring module 230 and an associated software-layer queuing buffer 231; and (b4) an event code processing module 240. In practical implementation, for example, the firmware-layer unit 100 can be implemented as an add-on firmware module for integration to the BIOS (Basic Input/Output System) unit on the computer platform 10, such as a BIOS module on a keyboard controller; while the software-layer unit 200 can be implemented as an add-on software module for integration to the operating system of the computer platform 10.

The peripheral operating event monitoring module 110 is capable of monitoring whether a peripheral operating event 30 occurs at the peripheral interface of the computer platform 10, and if YES, capable of responsively issuing a corresponding event message to the event code generating module 120.

The event code generating module 120 is capable of responding to each event message from the peripheral operating event monitoring module 110 by generating a corresponding event code based on a predefined event code mapping table such as the one shown in FIG. 2. It is to be noted that the event code mapping table shown in FIG. 2 is just an example of the realization of the invention, and in practice, the assignment of event codes to peripheral operating events is an arbitrary design choice and can have many various other instances of embodiments.

The event code queuing module 130 is equipped with a firmware-layer queuing buffer 131, such as a FIFO (First In First Out) type queuing buffer, for temporarily storing each event code generated by the event code generating module 120 in the firmware-layer queuing buffer 131.

The queue status indicating module 140 is capable of indicating whether the firmware-layer queuing buffer 131 is currently in an empty state or an occupied state, where "empty state" means that no event code is currently stored in the firmware-layer queuing buffer 131, whereas "occupied state" means that at least one event code is currently stored in the firmware-layer queuing buffer 131. In practical implementation, for example, the queue status indicating module 140 is implemented by using a register named "Mailbox Register" in an SMSC (Standard Microsystems Corporation) Keyboard Controller in such a manner that if the firmware-layer queuing buffer 131 is currently in empty state, the "Mailbox Register" will set a particular queue status flag to [0]; whereas if in occupied state, the queue status flag is set to [1]. Beside this example, various other implementation methods are possible.

On the software layer side, the timing module 210 in the software-layer unit 200 is capable of issuing a queue status check enabling message periodically at a preset interval, such as 250 ms (millisecond), to the queue status checking module 220.

The queue status checking module 220 is capable of responding to each queue status check enabling message from the timing module 210 to check whether the queue status indicating module 140 in the firmware-layer unit 100 currently indicates an occupied state (i.e., whether the firmware-layer queuing buffer 131 currently stores at least one event code); and if YES, capable of issuing a queue transfer enabling message to the queue transferring module 230.

The queue transferring module 230 is equipped with a software-layer queuing buffer 231, and which is capable of responding to each queue transfer enabling message from the queue status checking module 220 by transferring all the event codes in the firmware-layer queuing buffer 131 in the firmware-layer unit 100 to the software-layer queuing buffer 231 in the software-layer unit 200. In practical implementation, for example, the queue status checking module 220 can utilize the standard SMI (System Management Interrupt) signals to command the queue transferring module 230 in the software-layer unit 200 (which is integrated to the operating system) to perform the task of transferring the contents of the firmware-layer queuing buffer 131 to the software-layer queuing buffer 231.

The event code processing module 240 is capable of retrieving each event code stored in the software-layer queuing buffer 231 in a prespecified order, such as FIFO order, and process each retrieved event code to find its corresponding one of the event handling programs 40 that are integrated to the operating system of the computer platform 10 and execute the corresponding one of the event handling programs 40 to thereby respond to each of the peripheral operating events 30.

Referring to FIG. 1 together with FIG. 2, in actual operation, when the computer platform 10 is operated by the user and thereby produces a peripheral operating event 30 such as a hot-key pressing event, a multimedia broadcast operating key pressing event, a docking station engaging event, a docking station disengaging event, a multi-bay CD-ROM hot-plug event, or a fan driving event, it will cause the peripheral operating event monitoring module 110 to responsively issue a corresponding event message to the event code generating module 120 to activate the event code generating module 120 to produce a corresponding event code based on the event code mapping table shown in FIG. 2. Subsequently, the event code queuing module 130 will store the event code into the firmware-layer queuing buffer 131. When the event code is stored in the firmware-layer queuing buffer 131, it will cause the queue status indicating module 140 to indicate an "occupied state", such as by setting a flag value to [1].

Subsequently, if the computer platform 10 produces a second peripheral operating event 30, it will likewise cause the peripheral operating event monitoring module 110 to responsively issue a corresponding event message to the event code generating module 120 to activate the event code generating module 120 to produce a corresponding event code and subsequently command the event code queuing module 130 to store the event code into the firmware-layer queuing buffer 131.

On the other side (i.e., in the software-layer unit 200), the queue status checking module 220 will be controlled by the timing module 210 to periodically check whether the queue status indicating module 140 in the firmware-layer unit 100 currently indicates an occupied state or an empty state (i.e., whether the flag is [1] or [0]). If in occupied state (meaning that at least one event code is currently stored in the firmware-layer queuing buffer 131), the queue status checking module 220 will promptly issue a queue transfer enabling message to the queue transferring module 230, causing the queue transferring module 230 to responsively transfer every event code in the firmware-layer queuing buffer 131 in the firmware-layer unit 100 to the software-layer queuing buffer 231; and subsequently, the event code processing module 240 is activated to retrieve each event code stored in the software-layer queuing buffer 231 in a preset order, such as FIFO order, and process each retrieved event code to find its corresponding one of the event handling programs 40 that are integrated to the operating system of the computer platform 10 and execute the corresponding one of the event handling programs 40 to thereby respond to each of the peripheral operating events 30.

In conclusion, the invention provides a computer peripheral operating event responding method and system for use with a computer platform for providing a peripheral operating events responding function, and which is characterized by the provision of a firmware-layer queuing buffer in the firmware layer of the computer platform for temporarily storing the event code of every peripheral operating event occurs on the computer platform, which is periodically checked by the software layer to see if any event code is stored in the firmware-layer queuing buffer; and if YES, all the event codes in the firmware-layer queuing buffer are transferred to a software-layer queuing buffer in the software layer so as to allow the software layer (i.e., operating system) to process these event codes sequentially. This feature is more advantageous to use than prior art particularly in that it can be implemented without utilizing keyboard scan code and IRQ/PCI interrupt signals to provide a peripheral operating events responding function and is capable of responding to both on-keyboard peripheral operating events (such as hot-key pressing events) and off-keyboard peripheral operating events (such as docking station engaging event, docking station disengaging event, multi-bay CD-ROM hot-plug event, fan driving event, and so on). The invention therefore represents a highly integrated and efficient solution for computer peripheral operating event responding functionality.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A computer peripheral operating event responding method for use on a computer platform having a software layer and a firmware layer for providing the computer platform with a peripheral operating events responding function, the computer peripheral operating event responding method comprising:

on the firmware layer, monitoring whether a peripheral operating event occurs on the computer platform, and if YES, capable of issuing a corresponding event message;

on the firmware layer, responding to each event message by generating a corresponding event code;

on the firmware layer, storing each event code from an event code generating module in a firmware-layer queuing buffer;

on the firmware layer, providing a queue status indicating module for indicating whether the firmware-layer queuing buffer is currently in empty state or in occupied state, wherein the empty state means no event code is currently stored in the firmware-layer queuing buffer while the occupied state means at least one event code is currently stored in the firmware-layer queuing buffer;

on the software layer, issuing a queue status check enabling message periodically at preset intervals;

on the software layer, responding to each queue status check enabling message by checking whether the queue status indicating module in the firmware layer currently indicates an occupied state; and if YES, capable of issuing a queue transfer enabling message;

on the software layer, responding to each queue transfer enabling message by transferring every event code in the firmware-layer queuing buffer in the firmware-layer unit to a software-layer queuing buffer; and on the software layer, processing each event code in the software-layer queuing buffer to thereby execute a corresponding event handling program.

2. The computer peripheral operating event responding method of claim 1, wherein the computer platform is a notebook computer.

3. The computer peripheral operating event responding method of claim 1, wherein the computer platform is a desktop computer.

4. The computer peripheral operating event responding method of claim 1, wherein the computer platform is a tablet computer.

5. A computer peripheral operating event responding system for use with a computer platform for providing the computer platform with a peripheral operating events responding function, the computer peripheral operating event responding system comprising:

a firmware-layer unit, and
a software-layer unit;
wherein firmware-layer unit includes:
   a peripheral operating event monitoring module, which is capable of monitoring whether a peripheral operating event occurs on the computer platform, and if YES, capable of issuing a corresponding event message;
   an event code generating module, which is capable of responding to each event message from the peripheral operating event monitoring module by generating a corresponding event code;
   an event code queuing module, which is equipped with a firmware-layer queuing buffer for temporarily storing each event code from the event code generating module; and
   a queue status indicating module, which is capable of indicating whether the firmware-layer queuing buffer is currently in empty state or in occupied state, wherein the empty state means no event code is currently stored in the firmware-layer queuing buffer while the occupied state means at least one event code is currently stored in the firmware-layer queuing buffer; wherein the software-layer unit includes:
   a timing module, which is capable of issuing a queue status check enabling message periodically at preset intervals;
   a queue status checking module, which is capable of responding to each queue status check enabling message from the timing module by checking whether the queue status indicating module in the firmware-layer unit currently indicates an occupied state; and if YES, capable of issuing a queue transfer enabling message;
   a queue transferring module, which is equipped with a software-layer queuing buffer, and which is capable of responding to each queue transfer enabling message from the queue status checking module by transferring every event code in the firmware-layer queuing buffer in the firmware-layer unit to the software-layer queuing buffer; and
   an event code processing module, which is capable of processing each event code in the software-layer queuing buffer to thereby execute a corresponding event handling program.

6. The computer peripheral operating event responding system of claim 5, wherein the computer platform is a notebook computer.

7. The computer peripheral operating event responding system of claim 5, wherein the computer platform is a desktop computer.

8. The computer peripheral operating event responding system of claim 5, wherein the computer platform is a tablet computer.

9. The computer peripheral operating event responding system of claim 5, wherein the firmware-layer unit is integrated to a BIOS (Basic Input/Output System) module in a keyboard controller, while the software-layer unit is integrated into an operating system of the computer platform.

* * * * *